United States Patent
Löfvendahl et al.

(10) Patent No.: US 12,444,250 B2
(45) Date of Patent: Oct. 14, 2025

(54) CABIN FILTER STATE HANDLER

(71) Applicant: Volvo Car Corporation, Gothenburg (SE)

(72) Inventors: Anders Löfvendahl, Gothenburg (SE); André Portugal, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/240,525

(22) Filed: Aug. 31, 2023

(65) Prior Publication Data
US 2024/0078853 A1    Mar. 7, 2024

(30) Foreign Application Priority Data

Sep. 7, 2022 (EP) .................................. 22194466

(51) Int. Cl.
*G07C 5/08* (2006.01)

(52) U.S. Cl.
CPC ......... *G07C 5/0816* (2013.01); *G07C 5/0808* (2013.01)

(58) Field of Classification Search
CPC ........ A43B 3/34; A43B 5/00; G06Q 30/0261; G06Q 30/0631; G06Q 30/0639; G08B 1/08; G08B 21/22; G16Y 20/10; G16Y 40/10; G16Y 10/65; H04Q 2209/47; H04Q 2209/84
See application file for complete search history.

(56) References Cited

U.S. PATENT DOCUMENTS

| | | |
|---|---|---|
| 2017/0274737 A1 | 9/2017 | Delaruelle |
| 2017/0356835 A1* | 12/2017 | Hoke ..................... B60H 3/06 |
| 2018/0319256 A1* | 11/2018 | Stahl ................. B01D 46/4245 |
| 2021/0046411 A1* | 2/2021 | Löfvendahl .......... B60H 3/0633 |
| 2021/0060475 A1 | 3/2021 | Moredock et al. |
| 2021/0260957 A1 | 8/2021 | Reed et al. |

FOREIGN PATENT DOCUMENTS

| | | |
|---|---|---|
| CN | 108859672 A | 11/2018 |
| CN | 113291115 A | 8/2021 |

OTHER PUBLICATIONS

Office Action issued by the EPO in priority application EP 22 194 466.3.
Jan. 25, 2023 European Search Report issued in corresponding EP Application No. 22194466.

* cited by examiner

*Primary Examiner* — Sisay Yacob
(74) *Attorney, Agent, or Firm* — Clements Bernard Walker; Christopher L. Bernard

(57) ABSTRACT

A computer-implemented method for providing cabin filter state data relating to a state of a cabin filter of a vehicle, including: providing gas concentration data relating to a gas concentration of an output flow of at least one cabin filter of the vehicle; and providing cabin filter state data based on the gas concentration data.

18 Claims, 4 Drawing Sheets

CABIN FILTER STATE HANDLER

CROSS-REFERENCE TO RELATED APPLICATION

The present disclosure claims the benefit of priority of co-pending European Patent Application No. 22 194 466.3, filed on Sep. 7, 2022, and entitled "METHOD FOR PROVIDING ROUTE DATA FOR A VEHICLE," the contents of which are incorporated in full by reference herein.

TECHNICAL FIELD

The present disclosure relates to a method for providing cabin filter state data relating to a state of a cabin filter of a vehicle, a system for providing cabin filter state data relating to a state of a cabin filter of a vehicle, a vehicle with the system for providing cabin filter state data, a use of the method and a computer program element.

BACKGROUND

It is known that cabin filters of vehicles are replaced at fixed intervals and/or cycles, whereby these fixed intervals and/or cycles are independent of the usage time and/or traveled distance of the vehicle. Moreover, factors such as the customer's geographical location and the vehicle's driving routine, which have a significant influence on the condition of a cabin filter, do not affect the fixed intervals and/or cycles. As a result, cabin filters are replaced that may not be clogged or aged by use.

In view of this, it is found that a further need exists to provide an improved method for providing cabin filter state data.

SUMMARY

In the view of the above, it is an object of the present disclosure to provide a method for providing cabin filter state data.

According to a first aspect, a computer-implemented method for providing cabin filter state data relating to a state of a cabin filter of a vehicle, includes:
 providing gas concentration data relating to a gas concentration of an output flow of at least one cabin filter of the vehicle; and
 providing cabin filter state data based on the gas concentration data.

The computer-implemented method is carried out by a non-transitory computer-readable medium stored in a memory and executed by a processor to carry out the various steps of the method.

The gas concentration data may be measured, for example, in the output flow of the cabin filter and/or an interior of the vehicle.

In other words, by measuring the concentration of gas coming out of the cabin filter over time a filter efficiency for gas concentration of the cabin filter may be monitored.

In addition, the cabin filter state data may further include data or information on each filter of the vehicle. Moreover, the cabin filter data may at least include clogging data of the cabin filter.

Moreover, the cabin filter state data may be used, for example, to determine a state of one or more cabin filters and/or to predict a state trend over a period of use of the vehicle. Thereby, the state and/or the state trend may be used, for example, to initiate and/or plan a replacement of the cabin filter. Thus, replacement of the cabin filter may be improved, whereby the replacement may occur at a time when the cabin filter includes only poor or a predetermined performance.

In other words, due to the low cost of cabin filters, only predictions on the possible aging of cabin filters have been made so far, as a wide variety of parameters would have to be recorded and evaluated by reliable methods in order to determine actual aging of cabin filters. Thereby, it may be beneficial for a manufacturer of vehicles and/or customer or owner of a vehicle to know the actual aging of the cabin filters in order to replace a cabin filter if it includes a defined actual aging or requires replacement. Therefore, the replacement of cabin filters may deviate from a scheduled replacement cycle, which may result in an extension of cabin filter lifetime to save costs on unnecessary replacements.

In an implementation the method may further include:
 providing cabin blower current data relating to a current of a cabin blower for the cabin filter of the vehicle; and
 whereby providing cabin filter state data may further base on the cabin blower current data.

In other words, by measuring the current consumptions of the cabin blower at a fixed condition, such as a fixed cabin blower speed (rpm) and heating, ventilation and air conditioning (HVAC) system of the vehicle, the air flow resistance may be monitored. As the variation of the air flow from the cabin filter has a relation to the power consumption of the cabin blower.

The speed of the cabin blower may be controlled by the HVAC system depending on the demand whereby the speed of the cabin blower is constant during a specific demand. Therefore, the power consumption of the cabin blower may vary depending on the clogging of the cabin filter, as an increase in clogging will result in a decrease in power demand.

Therefore, in other words, for example, without adding any other components to the vehicle, the current consumption of the cabin blower may be detected and in order to determine the clogging of the cabin filter and in order to shorten or extend the life cycle of the filter.

In other words, an advantage of this disclosure may provide the use of a current consumption of the HVAC fan that is available but is merely used as a diagnostic input in case of a malfunction. Therefore, with only the use of the current consumption as an available signal, it may be possible to compare the current consumption when the cabin filter is new and the current consumption when the cabin filter is clogged, e.g. when the pressure drop has increased and/or less current is consumed.

For example, the cabin blower may be operated at a speed of 3000 rpm whereby the cabin blower required a current of 65 mA with a brand new cabin filter and a current of 50 mA with a clogged cabin filter.

In an implementation, the method may further include:
 providing particle concentration data relating to a particle concentration inside the vehicle and a particle concentration outside the vehicle; and
 whereby providing cabin filter state data may further base on the particle concentration data.

The particle concentration data may be measured, for example, in the output flow of the cabin filter and in an input flow of the cabin filter.

In other words, by comparing a measured value of an exterior sensor of the vehicle and an interior sensor of the vehicle a filter efficiency for particle concentration of the cabin filter may be determined. Alternatively, the comparing may be understood as a monitoring of an outside particle concentration of an outside sensor of the vehicle to an inside particle concentration of an inside sensor of the vehicle.

In an implementation, the method may further include:
providing microbial volatile organic compounds (MVOC) concentration data relating to a microbial volatile organic compounds concentration inside the vehicle; and
whereby providing cabin filter state data may further base on the microbial volatile organic compounds concentration data.

The MVOC concentration data may be measured, for example, in the output flow of the cabin filter and/or an interior of the vehicle.

In other words, by measuring the concentration of MVOC coming out of the cabin filter over time a filter efficiency for the MVOC growth of the cabin filter may be monitored.

In an implementation, the method may further include:
providing pressure data relating to a pressure behind the cabin blower for the cabin filter of the vehicle; and
whereby providing cabin filter state data may further base on the pressure data.

The pressure behind the cabin blower may relate to a pressure of air moved by the cabin blower.

In an implementation, the gas concentration data, the cabin blower current data, the particle concentration data, the microbial volatile organic compounds concentration data and/or the pressure data may be provided in predetermined time intervals, preferably the data may be provided in time intervals between 1 and 500 hours, the data may be provided in a time interval of 100 hours.

The predetermined time intervals may be based on, for example, the time of use of the vehicle, the time of use of a cabin blower or fan of the vehicle, and/or the time of day.

Alternatively, or additionally, in other words, the method may monitor a current of a cabin blower or fan of the vehicle in predetermined cycles or predetermined time intervals. For example, the cycle may include a cycle time of 100 hours, whereby the status of the cabin filter is updated according to this cycle time.

In an implementation, the method may further include:
providing cabin filter replacement data including predetermined replacement values relating to a gas concentration value, a cabin blower current value, a particle concentration value, a microbial volatile organic compounds concentration value and/or a pressure value, whereby the predetermined replacement values indicate that the cabin filter performance is below a predetermined performance.

In an implementation, the predetermined replacement values may be based on a predetermined threshold value with respect to a nominal performance of the cabin filter and whereby the threshold values are variably configurable.

For example, the threshold values may be varied, configured or set depending on the application or as required by a manufacturer of the cabin blower or fan, manufacturer of the vehicle and/or a driver of the vehicle. In addition, there may be a specific threshold value for each of the predetermined replacement values, whereby each of the specific threshold values may include a value that is different from the other specific threshold values.

In an implementation, the method may further include:
providing a cabin filter change notification for the at least one cabin filter based on a comparison of the cabin filter state data and the cabin filter replacement data.

The cabin filter change notification may be provided to the vehicle, an owner of the vehicle, a manufacturer of the vehicle. Thereby, the vehicle may provide the cabin filter change notification to the driver of the vehicle.

For example, the cabin filter change notification may be triggered by a filter status indicating whether the cabin filter is in a good condition or a poor condition, whereby the condition may represent the aging of the cabin filter. Furthermore, the cabin filter change notification may include a status indicator which indicates if the cabin filter is in a poor condition, whereby the condition may represent the aging of the cabin filter. Therefore, the cabin filter change notification may be triggered by a filter status indicating whether the cabin filter is in a good condition or a bad condition, whereby the condition may represent the aging of the cabin filter. The state may indicate a poor condition if the gas concentration, the particle concentration and/or MVOC concentration and/or the flow resistance and/or the energy demand of a fan of the cabin filter reached a defined value.

A further aspect of the present disclosure relates to a system for providing cabin filter state data relating to a state of a cabin filter of a vehicle, including:
a first providing unit configured to provide gas concentration data relating to a gas concentration of an output flow of at least one cabin filter of the vehicle; and
a second providing unit configured to provide cabin filter state data based on the gas concentration data.

In an implementation the system may further include:
a third providing unit configured to provide cabin blower current data relating to a current of a cabin blower for the cabin filter of the vehicle, whereby providing cabin filter state data is further based on the cabin blower current data; and/or
a fourth providing unit configured to provide particle concentration data relating to a particle concentration inside the vehicle and a particle concentration outside the vehicle, whereby providing cabin filter state data is further based on the particle concentration data; and/or
a fifth providing unit configured to provide microbial volatile organic compounds concentration data relating to a microbial volatile organic compounds concentration inside the vehicle, whereby providing cabin filter state data is further based on the microbial volatile organic compounds concentration data; and/or
a sixth providing unit configured to provide pressure data relating to a pressure behind the cabin blower for the cabin filter of the vehicle, whereby providing cabin filter state data is further based on the pressure data.

A further aspect of the present disclosure relates to a vehicle including the disclosed system.

A further aspect of the present disclosure relates to a use of the gas concentration data, the cabin blower current data, the particle concentration data, the microbial volatile organic compounds concentration data and/or the pressure data in the disclosed method and/or in the disclosed system.

A further aspect of the present disclosure relates to a computer program element, embodied in a non-transitory computer-readable medium, with instructions, which, when executed on a computing device of a computing environment, is configured to carry out the steps of the disclosed method in the disclosed system.

BRIEF DESCRIPTION OF THE DRAWINGS

In the following, the disclosure is described exemplarily with reference to the enclosed figures, in which.

Notably, the figures are merely schematic representations and serve only to illustrate examples of the present disclosure. Identical or equivalent elements are in principle provided with the same reference signs.

DETAILED DESCRIPTION

Figure 1:
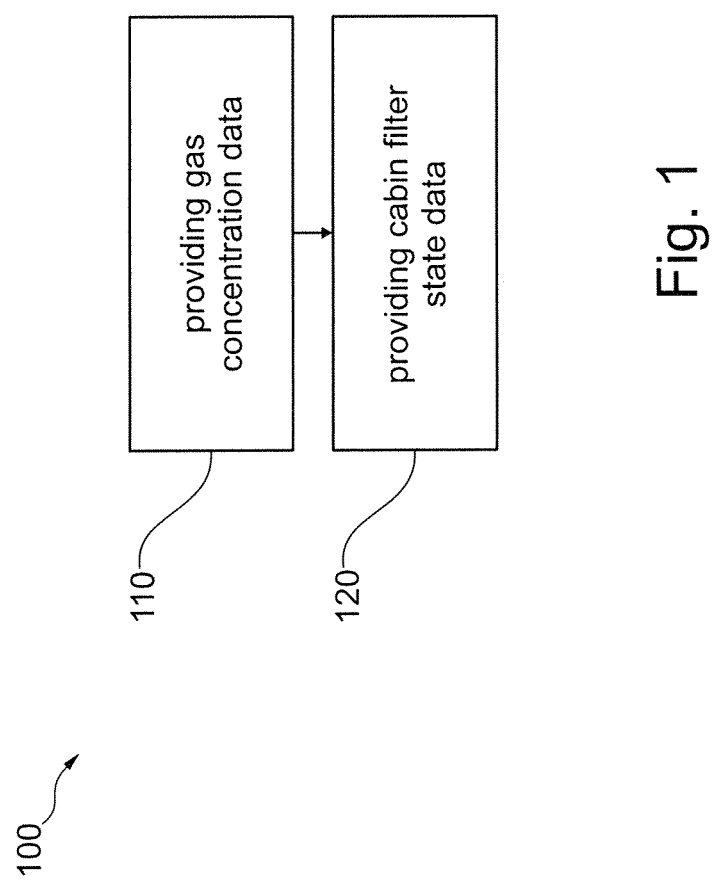
FIG. 1 is an example of a diagram of the disclosed method.

FIG. 1 shows an example of a diagram of the disclosed computer-implemented method 100 for providing cabin filter state data relating to a state of a cabin filter of a vehicle, including: providing 110 gas concentration data relating to a gas concentration of an output flow of at least one cabin filter of the vehicle; and providing 120 cabin filter state data based on the gas concentration data.

Figure 2:
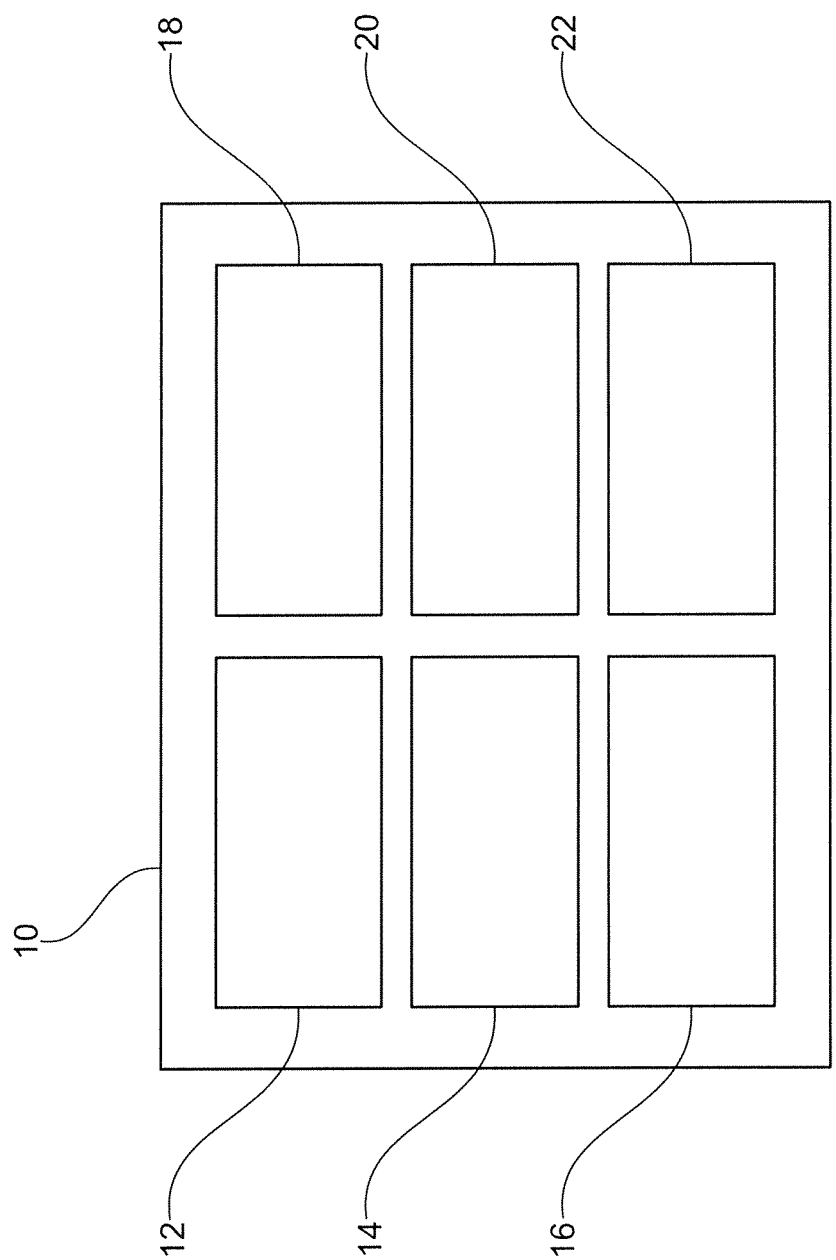
FIG. 2 is a schematic illustration showing an overview of an implementation of the disclosed system.

FIG. 2 shows a schematic illustration showing an overview of an implementation of the disclosed system 10 for providing cabin filter state data relating to a state of a cabin filter of a vehicle, including: a first providing unit 12 configured to provide gas concentration data relating to a gas concentration of an output flow of at least one cabin filter of the vehicle; and a second providing unit 14 configured to provide cabin filter state data based on the gas concentration data.

The system 10 further including: a third providing unit 16 configured to provide cabin blower current data relating to a current of a cabin blower for the cabin filter of the vehicle, whereby providing cabin filter state data is further based on the cabin blower current data; and/or a fourth providing unit 18 configured to provide particle concentration data relating to a particle concentration inside the vehicle and a particle concentration outside the vehicle, whereby providing cabin filter state data is further based on the particle concentration data. Furthermore, the system includes a fifth providing unit 20 configured to provide microbial volatile organic compounds concentration data relating to a microbial volatile organic compounds concentration inside the vehicle, whereby providing cabin filter state data is further based on the microbial volatile organic compounds concentration data; and/or a sixth providing unit 22 configured to provide pressure data relating to a pressure behind the cabin blower for the cabin filter of the vehicle, whereby providing cabin filter state data is further based on the pressure data.

Figure 3:
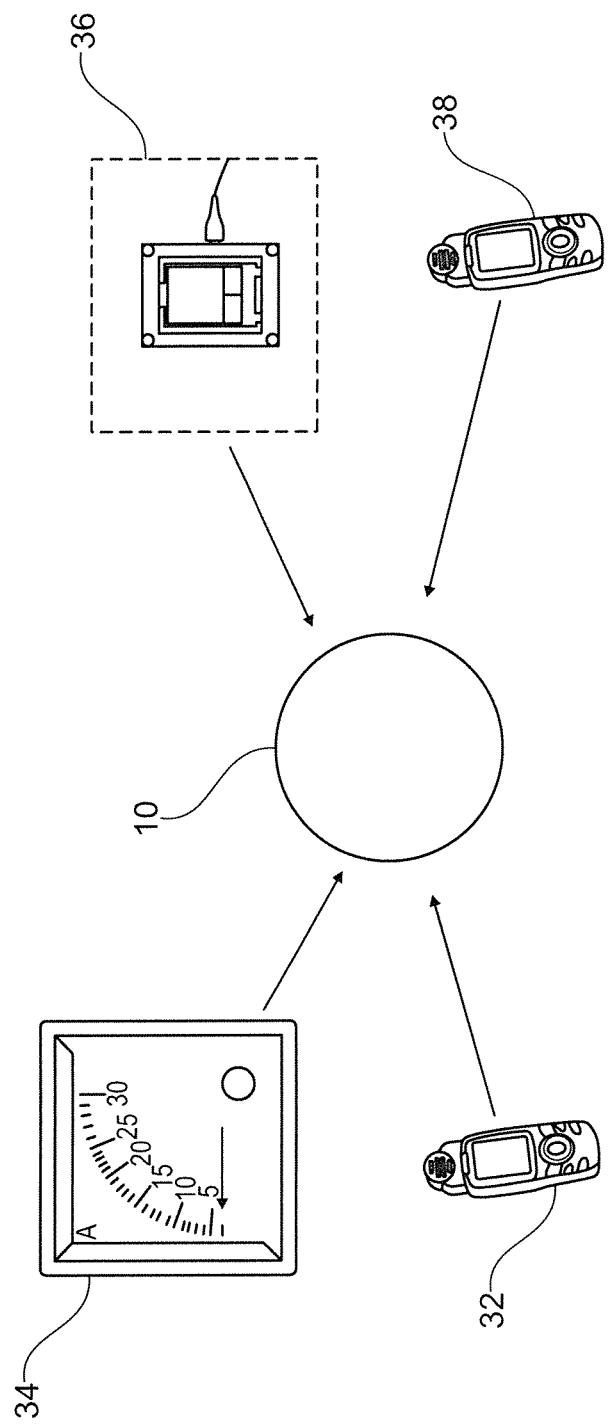
FIG. 3 is a schematic illustration of a data receiving of the disclosed system.

FIG. 3 shows a schematic illustration of a data receiving of the disclosed system 10, whereby the system 10 receives gas concentration by a gas sensor unit 32, cabin blower current data by a computing unit 34, particle concentration data by a particle concentration sensor unit 36 and MVOC concentration data by a MVOC concentration sensor unit 38.

Furthermore, the particle concentration data may be provided by a first and a second particle concentration sensor.

In addition, the system 10 may receive pressure data of a pressure of an air flow behind the cabin blower for the cabin filter of the vehicle.

Figure 4:
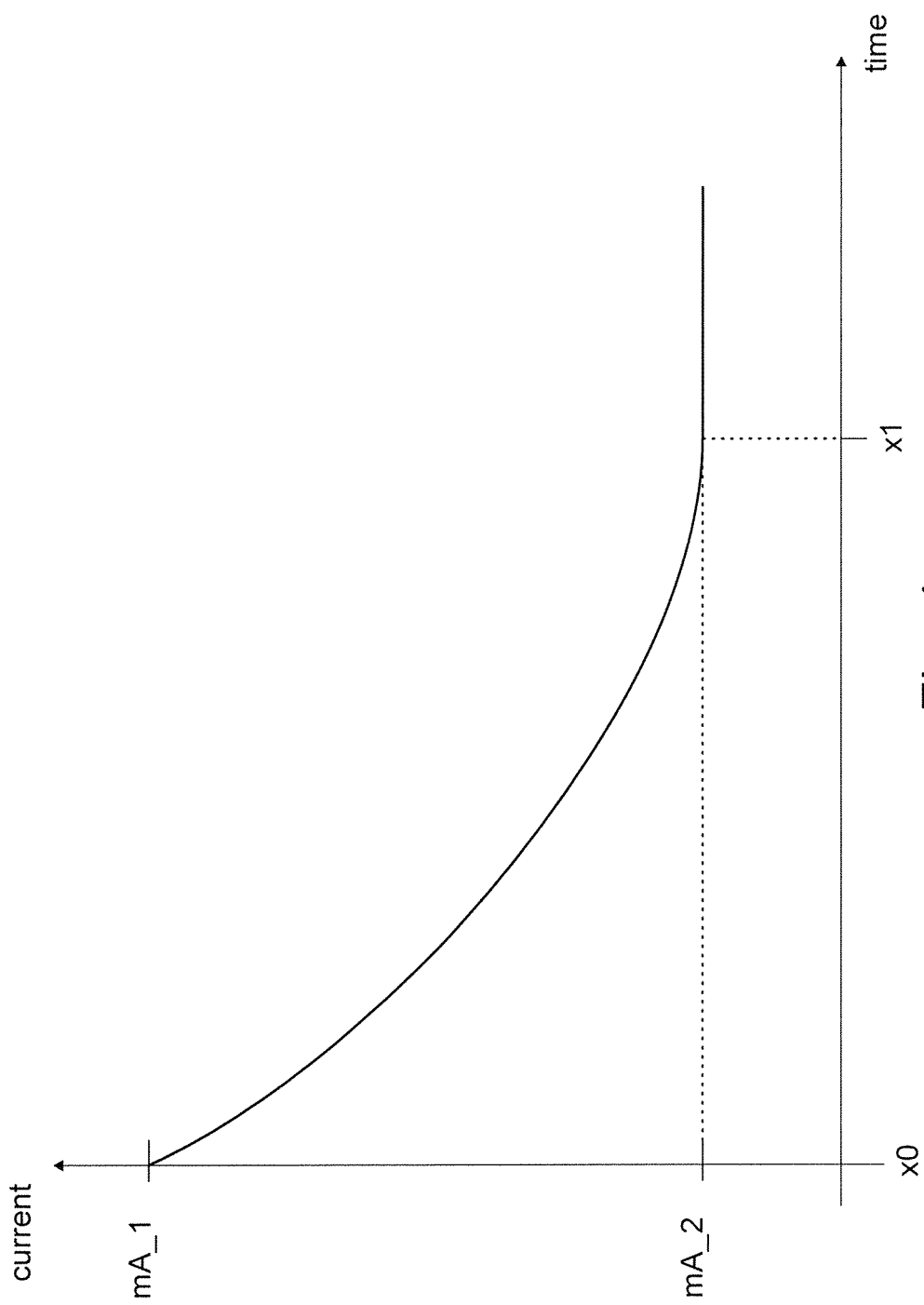
FIG. 4 is a schematic illustration of a diagram of the energy consumption of a cabin blower.

FIG. 4 shows a schematic illustration of a diagram of the energy consumption of a cabin blower, whereby a horizontal axis represents a time, e.g. usage time of the vehicle, and a vertical axis represents a current, e.g. current consumption, of the blower of a vehicle. It was found that the current consumption, e.g. energy consumption, of the cabin blower decreases over the usage time of the vehicle, whereby this decrease results from the aging and/or clogging of the cabin filter. Therefore, the current consumption of the cabin blower may indicate that the cabin filter is aged, in order to initiate a replacement of the cabin filter.

Therefore, the diagram includes a first time value $x0$ of the use of a new cabin filter and a first current consumption value $mA\_1$ (e.g. 65 mA), which was detected during the first use of the new cabin filter. Furthermore, the diagram includes a second current consumption value $mA\_2$, which represents a lower current consumption value or limit value (e.g. time to change filter). The diagram illustrates how the current consumption reaches the limit value of $mA\_2$ at a time value of $x1$ as the time progresses and the filter ages. Thus, for example, a driver of the vehicle may be informed about the aged and/or clogged cabin filter at the time value $x1$. For example, a replacement of the cabin filter can be recommended either at a predetermined current limit value ($mA\_2$) or recommended at a specific delta of the first and second current consumption values ($mA\_1-mA\_2=delta\_mA$).

As provided above, the computer-implemented method is carried out by a non-transitory computer-readable medium stored in a memory and executed by a processor to carry out the various steps of the method.

Other variations to the disclosed examples may be understood and effected by those skilled in the art in practicing the claimed subject matter, from the study of the figures, the disclosure, and the appended claims. In particular, respective parts/functions of the respective example described above may also be combined with each other. In particular, the present disclosure is not limited to specific modules, vehicle functions, user interfaces, user interface areas/fields and/or communication methods. In the claims, the word "comprising" does not exclude other elements or steps and the indefinite article "a" or "an" does not exclude a plurality. The mere fact that certain measures are recited in mutually different dependent claims does not indicate that a combination of these measures may not be used to advantage. Any reference signs in the claims should not be construed as limiting the scope of the claims.

The invention claimed is:

1. A computer-implemented method for providing cabin filter state data relating to a state of a cabin filter of a vehicle, the computer-implemented method comprising:
    providing gas concentration data relating to a gas concentration of an output flow of at least one cabin filter of the vehicle, wherein the gas concentration data indicates cabin filter efficiency;
    providing cabin blower current data relating to a current of a cabin blower for the at least one cabin filter of the vehicle, wherein the cabin blower current data indicates cabin filter clogging; and
    providing cabin filter state data based on the gas concentration data and the cabin blower current data.

2. The computer-implemented method according to claim 1, the method further comprising:
    providing particle concentration data relating to a particle concentration inside the vehicle and a particle concentration outside the vehicle; and
    wherein providing cabin filter state data is further based on the particle concentration data.

3. The computer-implemented method according to claim 1, the method further comprising:
    providing microbial volatile organic compounds (MVOC) concentration data relating to a microbial volatile organic compounds concentration inside the vehicle; and wherein providing cabin filter state data is further based on the microbial volatile organic compounds concentration data.

4. The computer-implemented method according to claim 1, the method further comprising:
providing pressure data relating to a pressure behind the cabin blower for the cabin filter of the vehicle; and
wherein providing cabin filter state data is further based on the pressure data.

5. The computer-implemented method according to claim 1, wherein the gas concentration data, the cabin blower current data, the particle concentration data, the microbial volatile organic compounds concentration data and/or the pressure data are provided in predetermined time intervals between 1 and 500 hours.

6. The computer-implemented method according to claim 1, the method further comprising:
providing cabin filter replacement data comprising predetermined replacement values relating to a gas concentration value, a cabin blower current value, a particle concentration value, a microbial volatile organic compounds concentration value and/or a pressure value, wherein the predetermined replacement values indicate that the cabin filter performance is below a predetermined performance.

7. The computer-implemented method according to claim 6, wherein the predetermined replacement values are based on a predetermined threshold value with respect to a nominal performance of the cabin filter and wherein the predetermined threshold value is variably configurable.

8. The computer-implemented method according to claim 1, the method further comprising:
providing a cabin filter change notification for the at least one cabin filter based on a comparison of the cabin filter state data and the cabin filter replacement data.

9. A system for providing cabin filter state data relating to a state of a cabin filter of a vehicle, the system comprising:
a first providing unit configured to provide gas concentration data relating to a gas concentration of an output flow of at least one cabin filter of the vehicle, wherein the gas concentration data indicates cabin filter efficiency;
a second providing unit configured to provide cabin blower current data relating to a current of a cabin blower for the at least one cabin filter of the vehicle; and
a third providing unit configured to provide cabin filter state data based on the gas concentration data and the cabin blower current data.

10. The system according to claim 9, further comprising:
a fourth providing unit configured to provide particle concentration data relating to a particle concentration inside the vehicle and a particle concentration outside the vehicle, wherein providing cabin filter state data is further based on the particle concentration data;
a fifth providing unit configured to provide microbial volatile organic compounds concentration data relating to a microbial volatile organic compounds concentration inside the vehicle, wherein providing cabin filter state data is further based on the microbial volatile organic compounds concentration data; and/or
a sixth providing unit configured to provide providing pressure data relating to a pressure behind the cabin blower for the cabin filter of the vehicle, wherein providing cabin filter state data is further based on the pressure data.

11. The system of claim 9, wherein the first providing unit, the second providing unit, and the third providing unit are each implemented as a processor system in the vehicle.

12. A non-transitory computer-readable medium comprising instructions stored in a memory and executed by a processor for carrying out a method for providing cabin filter state data relating to a state of a cabin filter of a vehicle, the method comprising:
providing gas concentration data relating to a gas concentration of an output flow of at least one cabin filter of the vehicle, wherein the gas concentration data indicates cabin filter efficiency;
providing cabin blower current data relating to a current of a cabin blower for the at least one cabin filter of the vehicle, wherein the cabin blower current data indicates cabin filter clogging; and
providing cabin filter state data based on the gas concentration data and the cabin blower current data.

13. The non-transitory computer-readable medium according to claim 12, the method further comprising:
providing particle concentration data relating to a particle concentration inside the vehicle and a particle concentration outside the vehicle; and
wherein providing cabin filter state data is further based on the particle concentration data.

14. The non-transitory computer-readable medium according to claim 12, the method further comprising:
providing microbial volatile organic compounds (MVOC) concentration data relating to a microbial volatile organic compounds concentration inside the vehicle; and
wherein providing cabin filter state data is further based on the microbial volatile organic compounds concentration data.

15. The non-transitory computer-readable medium according to claim 12, the method further comprising:
providing pressure data relating to a pressure behind the cabin blower for the cabin filter of the vehicle; and
wherein providing cabin filter state data is further based on the pressure data.

16. The non-transitory computer-readable medium according to claim 12, the method further comprising:
providing cabin filter replacement data comprising predetermined replacement values relating to a gas concentration value, a cabin blower current value, a particle concentration value, a microbial volatile organic compounds concentration value and/or a pressure value, wherein the predetermined replacement values indicate that the cabin filter performance is below a predetermined performance.

17. The non-transitory computer-readable medium according to claim 16, wherein the predetermined replacement values are based on a predetermined threshold value with respect to a nominal performance of the cabin filter and wherein the predetermined threshold value is variably configurable.

18. The non-transitory computer-readable medium according to claim 12, the method further comprising:
providing a cabin filter change notification for the at least one cabin filter based on a comparison of the cabin filter state data and the cabin filter replacement data.

* * * * *